(12) United States Patent
Yamashita

(10) Patent No.: US 7,996,131 B2
(45) Date of Patent: Aug. 9, 2011

(54) TILT ANGLE DETECTING APPARATUS FOR VEHICLE, AND ROLLOVER JUDGING APPARATUS USING THIS TILT ANGLE DETECTING APPARATUS FOR VEHICLE

(75) Inventor: Toshiyuki Yamashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 533 days.

(21) Appl. No.: 12/224,088

(22) PCT Filed: Feb. 15, 2007

(86) PCT No.: PCT/JP2007/052756
§ 371 (c)(1),
(2), (4) Date: Aug. 18, 2008

(87) PCT Pub. No.: WO2007/141934
PCT Pub. Date: Dec. 13, 2007

(65) Prior Publication Data
US 2009/0088926 A1    Apr. 2, 2009

(30) Foreign Application Priority Data
Jun. 2, 2006   (JP) ................. 2006-154923

(51) Int. Cl.
*B60R 21/13*   (2006.01)
*B60R 21/01*   (2006.01)

(52) U.S. Cl. ............... 701/46; 701/38; 280/735

(58) Field of Classification Search ............. 701/1, 38, 701/46, 47; 340/440; 280/735
See application file for complete search history.

(56) References Cited

U.S. PATENT DOCUMENTS
6,496,759 B1   12/2002   Mattes et al.

FOREIGN PATENT DOCUMENTS
| JP | 10-253361 A | 9/1998 |
| JP | 2002-518249 A | 6/2002 |
| JP | 3413327 B2 | 3/2003 |
| JP | 2005-172662 A | 6/2005 |

*Primary Examiner* — Ruth Ilan
*Assistant Examiner* — Timothy D Wilhelm
(74) *Attorney, Agent, or Firm* — Birch, Stewart, Kolasch & Birch, LLP

(57) ABSTRACT

A tilt angle detecting apparatus removes an unnecessary component included in an angular velocity detecting signal (an input ω) inputted from an angular velocity sensor 1 with the deadband (−ωo to +ωo) of an unnecessary component removing means 2, performs integration processing on the angular velocity detecting signal (an output ω) which is allowed to pass through the passband (input ω>ωo or input ω<−ωo) of the unnecessary component removing means 2 and which is outputted from the unnecessary component removing means by using an arithmetic processing means 3, performs a process of resetting the integral value to zero using a fixed integral value resetting value which is determined in such a way as to be suited to the above-mentioned deadband by using an integral value resetting means 4 after the integration processing, and outputs a signal showing the roll angle θv of a vehicle.

10 Claims, 14 Drawing Sheets

(a)

(b)

(c)

(a)

(b)

(c)

(a)

(b)

(c)

TILT ANGLE DETECTING APPARATUS FOR VEHICLE, AND ROLLOVER JUDGING APPARATUS USING THIS TILT ANGLE DETECTING APPARATUS FOR VEHICLE

FIELD OF THE INVENTION

The present invention relates to a tilt angle detecting apparatus for vehicle which detects a tilt angle of a vehicle in the direction of a rollover (rollover) of the vehicle by using an angular velocity sensor with a higher degree of precision, and a rollover judging apparatus which uses the tilt angle detecting apparatus for vehicle.

BACKGROUND OF THE INVENTION

As conventional tilt angle detecting apparatus for vehicle including an angular velocity sensor mounted in a vehicle, for detecting the tilt angle of the vehicle, there are, for example, the following conventional examples. As conventional example 1, there has been provided a tilt angle detecting apparatus for vehicle which is aimed at correctly correcting the offset error of an angular velocity sensor (a yaw rate sensor) for detecting the rotation angle velocity of the vehicle, which, as the correcting method, uses an offset correction method of correcting the offset of a gyro sensor in performing a tracking operation for satellite reception, and, when the offset error is large, increases the frequency with which the tilt angle detecting apparatus for vehicle corrects the offset error and then, when this correction of the offset error advances and the offset error becomes small, reduces the frequency with which it makes an incorrect correction (for example, refer to patent reference 1).

As conventional example 2, there has been provided a tilt angle detecting apparatus for vehicle which is aimed at making it possible to make an offset correction to an angular velocity sensor, and to diagnose the sensitivity of the angular velocity sensor, which, by using an offset correction unit, acquires an offset correction value from an angular velocity value which is acquired from detection signals which are outputted by a plurality of angular velocity sensors, and a detection signal which is outputted by an angular velocity sensor mounted in a vehicle which is standing still, and then makes an offset correction to the angular velocity value using the offset correction value, and which, by using a sensor sensitivity diagnostic unit, detects that the vehicle is making a turn on the basis of the detection signals of the plurality of angular velocity sensors, and then diagnoses the sensitivities of a plurality of angle sensors from the angular velocity values of the plurality of angular velocity sensors which have been offset-corrected while the vehicle is making a turn (for example, refer to patent reference 2).

[Patent reference 1] Japanese patent No. 3413327
[Patent reference 2] JP, 2005-172662, A The conventional tilt angle detecting apparatuses for vehicle are constructed as mentioned above, and conventional example 1 (patent reference 1) and conventional example 2 (patent reference 2) achieve their objectives, respectively.

A problem is, however, that when any of these conventional exemplary methods is applied to an angular velocity sensor for detecting the angular velocity of a vehicle in a roll direction of the vehicle, peripheral equipment has to be additionally disposed and a more complicated system configuration is needed.

The present invention is made in order to solve the above-mentioned problem, and it is therefore an object of the present invention to provide a tilt angle detecting apparatus for vehicle which makes it possible to detect a tilt angle of a vehicle in a roll direction of the vehicle correctly without having to additionally include peripheral equipment and with a simple structure, and a rollover judging apparatus which uses the tilt angle detecting apparatus for vehicle.

DISCLOSURE OF THE INVENTION

In accordance with the present invention, there is provided a tilt angle detecting apparatus for vehicle including: an angular velocity sensor for detecting an angular velocity of a vehicle which occurs in a roll direction of the vehicle; an unnecessary component removing means in which a first angular velocity value is preset up for a setting of a deadband used for removing an unnecessary component, such as noise, the above-mentioned unnecessary component removing means having both the deadband for reducing a level of an output signal to zero or attenuating this level when an angular velocity detecting signal inputted from the above-mentioned angular velocity sensor has an angular velocity level equal to or less than the above-mentioned first angular velocity value, and a passband for allowing the angular velocity detecting signal to pass therethrough and outputting this angular velocity detecting signal when the angular velocity detecting signal has an angular velocity level exceeding the above-mentioned first angular velocity value, for outputting the angular velocity detecting signal from which the unnecessary component is removed; an arithmetic processing means for integrating the angular velocity detecting signal inputted from the above-mentioned unnecessary component removing means to output a signal having the integral value showing an angle; and an integral value resetting means in which an integral value resetting value which is a fixed value is preset up, for resetting the integral value showing the angle of the signal inputted from the above-mentioned arithmetic processing means to zero by using the above-mentioned integral value resetting value in such a way that the integral value does not diverge, and for outputting a signal showing a tilt angle in the roll direction of the vehicle.

As mentioned above, in accordance with the present invention, the unnecessary component included in the angular velocity detecting signal inputted from the angular velocity sensor is removed with the deadband of the unnecessary component removing means, the integration processing is performed on the angular velocity detecting signal which is allowed to pass through the passband of this unnecessary component removing means and which is outputted, and, after this integration processing, the fixed integral value resetting value is used to perform the process of resetting the integral value to zero and a signal showing the tilt angle of the vehicle in the roll direction is outputted. Therefore, with the removal of the unnecessary component, such as offset noise, using the unnecessary component removing means, and the process of resetting the integral value to zero, the integral value showing the angle can be held for a long time without diverging and the tilt angle of the vehicle in the roll direction can be detected correctly.

In addition, there is no necessity to add peripheral equipment and the tilt angle of the vehicle in the roll direction can be detected with the simple structure.

BRIEF DESCRIPTION OF THE FIGURES

FIG. 2(a) is an explanatory drawing of the measurement target of the angle sensor, FIG. 2(b) is an explanatory drawing of the angular velocity component which occurs in a turning traveling mode, and FIG. 2(c) is an explanatory drawing of the angular velocity component which occurs in a spiral road traveling mode;

FIG. 3(a) is a block diagram showing the integration process, FIG. 3(b) is an explanatory drawing showing occurrence of an error, and FIG. 3(c) is an explanatory drawing showing a resetting of an integral value;

FIG. 4(a) is a diagram showing the input-output behavioral characteristics of an unnecessary component removing means, FIG. 4(b) is a waveform chart showing an example of an angular velocity detecting signal outputted from an angular velocity sensor at the time when the vehicle is travelling along a spiral road, and FIG. 4(c) is an explanatory drawing of the resetting of the integral value;

FIG. 6(a) is a diagram showing the input-output behavioral characteristics of the unnecessary component removing means shown in FIG. 1, FIG. 6(b) is a diagram showing the input-output behavioral characteristics of an unnecessary component removing means shown in FIG. 5, and FIG. 6(c) is an explanatory drawing of a resetting of an integral value;

FIG. 9(a) is a diagram showing the input-output behavioral characteristics of the unnecessary component removing means in accordance with Embodiment 3 (FIG. 7) and FIG. 9(b) is a diagram showing the input-output behavioral characteristics of an unnecessary component removing means in accordance with this Embodiment 4 (FIG. 8);

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
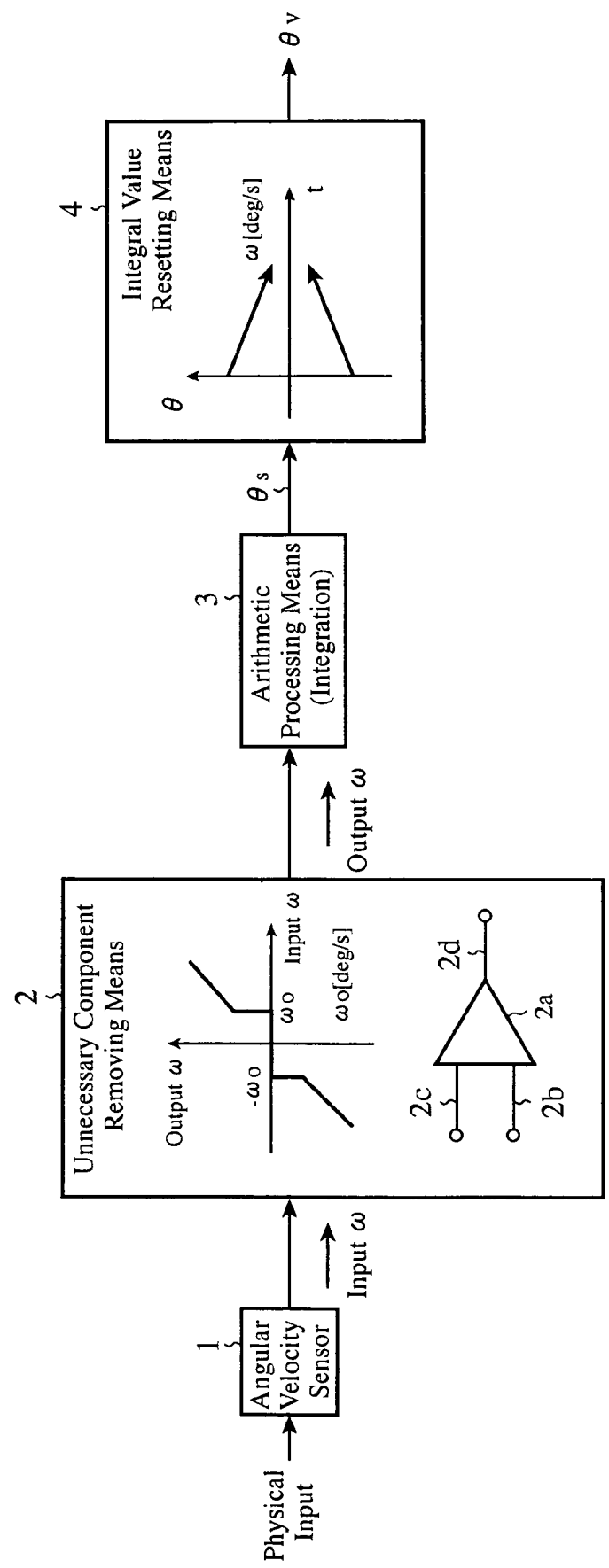
FIG. 1 is a block diagram showing the structure of a tilt angle detecting apparatus for vehicle in accordance with Embodiment 1 of the present invention.

FIG. 1 is a block diagram showing the structure of a tilt angle detecting apparatus for vehicle in accordance with Embodiment 1 of the present invention.

In FIG. 1, this tilt angle detecting apparatus for vehicle is comprised of an angular velocity sensor 1, an unnecessary component removing means 2, an arithmetic processing means 3, and an integral value resetting means 4.

In the above-mentioned structure, the angular velocity sensor 1 detects the angular velocity of a vehicle which occurs in a roll direction of the vehicle, and is also called a roll rate sensor because the angular velocity sensor detects the angular velocity of the vehicle in the roll direction. This angular velocity sensor 1 (the roll rate sensor) uses, for example, a gyro sensor, and converts the physical angular velocity which occurs in the roll direction of the vehicle into a voltage signal by using this gyro sensor. This converted voltage signal is an angular velocity detecting signal outputted from the angular velocity sensor 1. This angular velocity detecting signal has a value of positive polarity (+) or a value of negative (−) polarity according to the direction of the detected angular velocity.

The unnecessary component removing means 2 has a deadband in which the unnecessary component removing means removes an unnecessary component having a small level, such as noise, which is included in the angular velocity detecting signal from the angular velocity sensor 1, and a passband in which the unnecessary component removing means allows components included in the angular velocity detecting signal each having a level exceeding the level removed with the above-mentioned deadband to pass therethrough, and outputs an angular velocity signal ω in the passband from which the unnecessary component is removed.

This unnecessary component removing means 2 is provided with, for example, a comparator 2a which has an input end 2b to which an angular velocity (ωo) which defines the deadband is set and another input end 2c to which the angular velocity detecting signal from the angular velocity sensor 1 is inputted, and which outputs the angular velocity signal ω in the passband from which the unnecessary component is removed via an output end 2d thereof.

The arithmetic processing means 3 performs arithmetic processing on the angular velocity signal ω from which the unnecessary component is removed by the unnecessary component removing means 2, and outputs a signal having an integral value showing an angle θs. Typically, this arithmetic processing is integration processing or integration filter processing.

The integral value resetting means 4 has a fixed integral-value resetting value preset thereto, performs a process of resetting the integral value by using the above mentioned integral-value resetting value to zero in such a way that the integral value showing the angle θs of the signal inputted from the arithmetic processing means 3 does not diverge, and outputs a signal showing a tilt angle θv of the vehicle in the roll direction (referred to as a "roll angle" from here on). The integral-value zero resetting is carried out through a process of attenuating or resetting the signal having of the integral value showing the angle θs which is inputted from the arithmetic processing means 3, or the like.

Before an explanation of the operation of the above-mentioned structure shown in FIG. 1, a background which results in the structure of this FIG. 1 will be explained hereafter.

Figure 2:
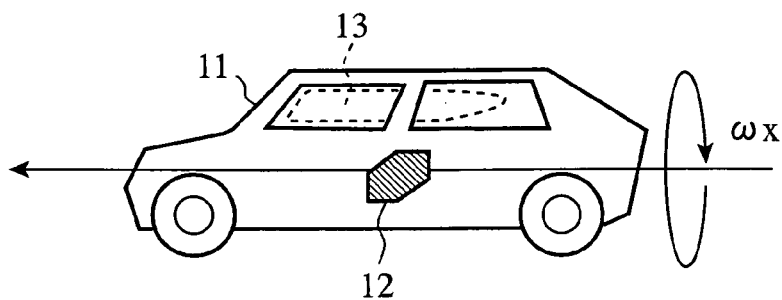
FIG. 2 is an explanatory drawing of a target for measurement by an angle sensor and an angular velocity component in various traveling modes of a vehicle in the tilt angle detecting apparatus for vehicle in accordance with Embodiment 1 of the present invention.
Figure 2:
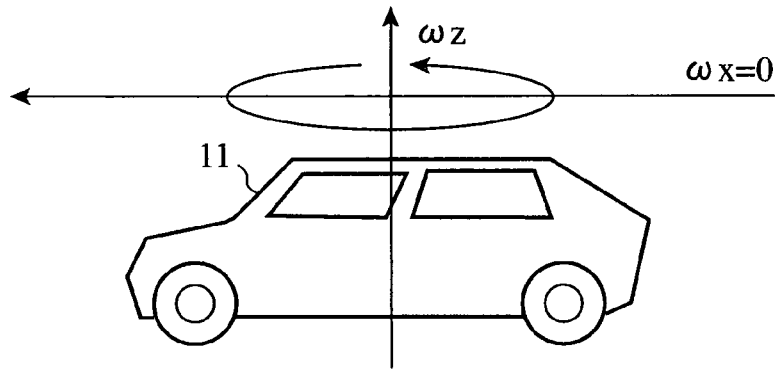
Figure 2:
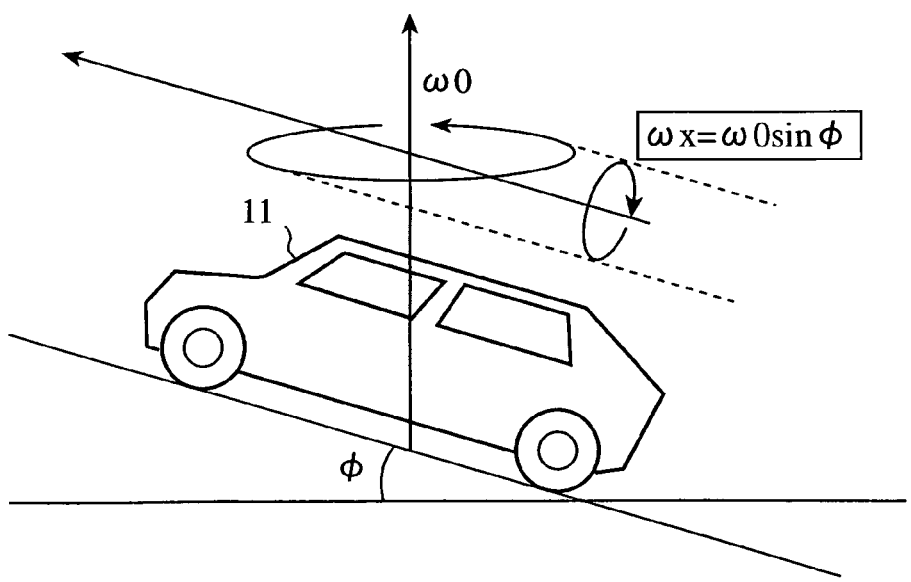

FIG. 2 is an explanatory drawing of a measurement object of the angular velocity sensor (the roll rate sensor), and an angular velocity component in each of various traveling modes of the vehicle. FIG. 2(a) shows the measurement object of the angular velocity sensor, FIG. 2(b) shows the angular velocity component which occurs in a turning traveling mode, and FIG. 2(c) shows the angular velocity component which occurs in a spiral road traveling mode.

In FIG. 2(a), the angular velocity sensor which functions as a roll rate sensor is mounted in such a way as to detect a roll rate component ωx of the vehicle 11 when the vehicle makes a rollover (rollover).

An airbag control unit 12 including the structure of FIG. 1 is mounted in a central part of the vehicle 11 and an air bag 13 is mounted in each side of the vehicle. When the above-mentioned roll rate component ωx becomes a large value and hence the roll angle of the vehicle becomes larger than a predetermined angle, the airbag control unit 12 outputs a driving signal to the air bag 13 mounted on the side of the vehicle, and carries out expansion control of the air bag 13 so as to protect the passengers when the vehicle is rolling over.

In the turning traveling mode in which the vehicle 11 is making a turn on a level surface, as shown in FIG. 2(b), only a yaw rate (rotation) component ωz occurs while the above-mentioned roll rate component ωx which is the target to be measured by the angular velocity sensor does not occur.

Furthermore, in the spiral turning mode which the vehicle 11 is making a turn while the vehicle 11 is inclined in the direction of the length thereof, as shown in FIG. 2(c), the roll rate component ωx (=ωo Sin □) occurs for the turning component ωo even through the vehicle 11 are not rolling. This ωx (=ωo Sin □) is an unnecessary component (a component in a direction of another axis) which is not related to the roll angle of the vehicle 11. Also in a case in which the vehicle 11 is making a turn along a curve of a mountain road or the like while the vehicle 11 is inclined in the direction of the length thereof, other than the spiral turning mode, a roll rate component similarly occurs.

In a case in which such an unnecessary roll rate component ωx is outputted from the angular velocity sensor and this output is simply integrated, the integral value diverges and a large error occurs in the actual roll angle. Hereafter, this error will be explained with reference to FIG. 3.

Figure 3:
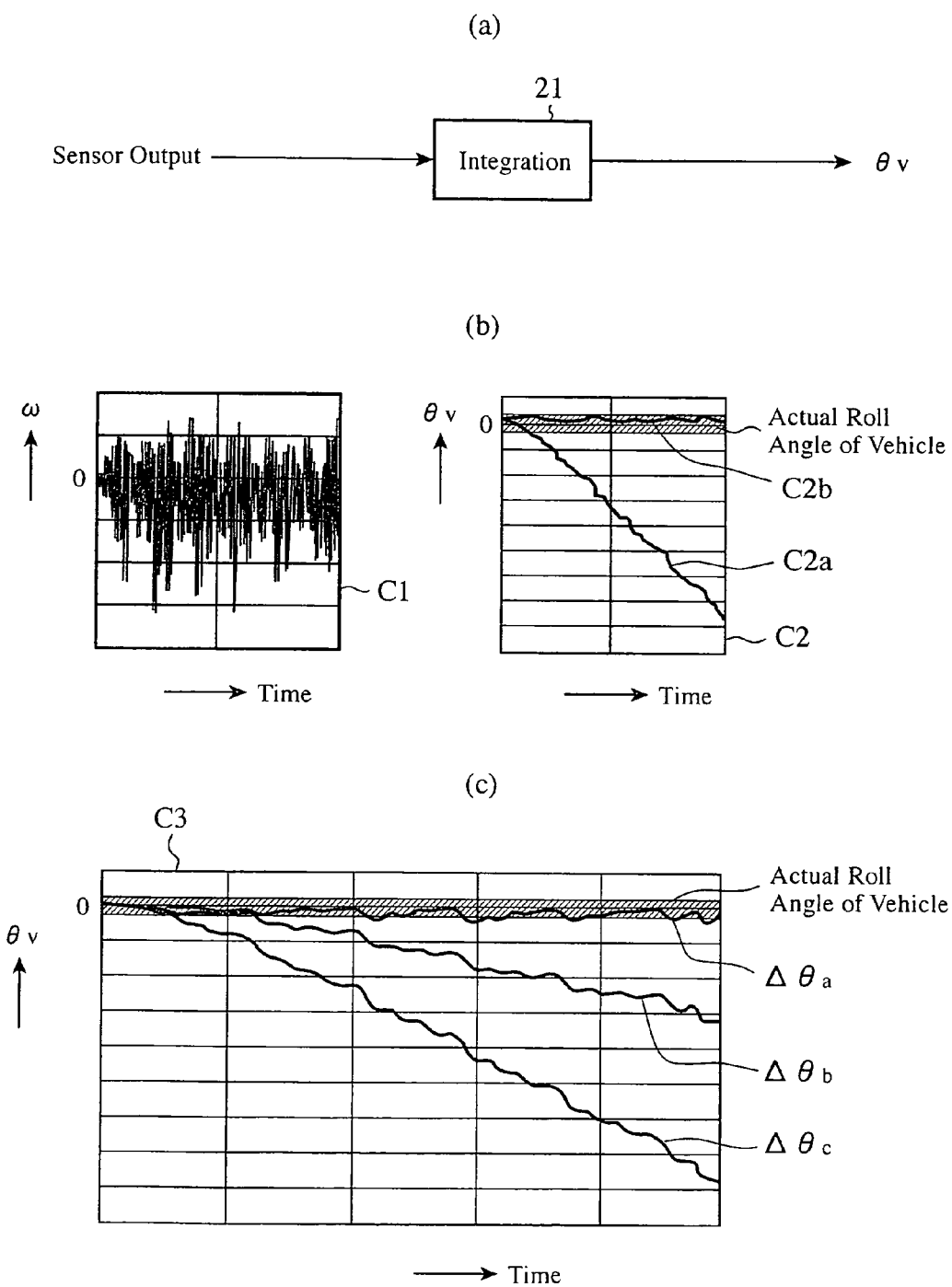
FIG. 3 is an explanatory drawing of an integration process carried out by the tilt angle detecting apparatus for vehicle in accordance with Embodiment 1 of the present invention.

FIG. 3 is an explanatory drawing of the integration processing, FIG. 3(a) is a block diagram showing the configuration of the integration processing, FIG. 3(b) is an explanatory drawing showing occurrence of an error, and FIG. 3(c) is an explanatory drawing showing the resetting of the integral value.

In FIG. 3(b), a characteristic diagram C1 is a diagram in which its horizontal axis shows a time (ms) and its vertical axis shows the angular velocity ω (deg/sec) and is an example of the characteristic of the angular velocity ω which is outputted from the angle sensor in the spiral road traveling mode, and a characteristic diagram C2 is a diagram in which its horizontal axis shows a time (ms) and its vertical axis shows the roll angle θv (deg), and a characteristic C2a shows the waveform of the integral value and a characteristic C2b shows the actual roll angle of a vehicle.

A characteristic diagram C3 of FIG. 3(c) is an example of a characteristic in which its horizontal axis shows a time (ms) and its vertical axis shows the roll angle θv (deg) when integral value resetting values Δθa, Δθb, and Δθc (Δθa>Δθb>Δθc) (deg/sec) are defined as parameters, and shows states of the resetting of the integral value.

For example, when the signal showing the angular velocity ω in the characteristic diagram C1 shown in FIG. 3(b) from the angular velocity sensor is inputted to the integration processing unit 21 of FIG. 3(a) in the spiral road traveling mode, the integration processing unit 21 performs the integration processing on the signal showing this angular velocity ω, and outputs a signal showing the roll angle θv having the integral waveform of the characteristic C2a shown in FIG. 3(b). In contrast with this, the actual roll angle of a vehicle is substantially 0 (deg), as shown in the characteristic C2b, the roll angle θv of the characteristic C2a which is obtained through the integration processing by the integration processing unit 21 deviates greatly from the actual roll angle of a vehicle shown in the characteristic C2b, and has an error. Thus, in the spiral road traveling mode, the unnecessary roll rate component ωx is outputted from the angle sensor, and simple integration of this output causes the integral value to diverge and therefore the calculated roll angle has a large error with respect to the actual roll angle of a vehicle. In order to suppress a deviation of the roll angle θv on which the integration processing is performed in this way, from the actual roll angle of a vehicle, the divergence of the integral value is suppressed by setting up an integral value resetting value (Δθ), as shown in FIG. 3(c), which resetting the integral value to zero in decrements of a fixed value. This makes it possible to suppress occurrence of errors. However, this integral value resetting value (Δθ) has an appropriate value, and it is necessary to set up the integral value resetting value according to the degree of the deviation of the roll angle θv on which the integration processing is performed in this way, from the actual roll angle of a vehicle. For example, when this integral value resetting value (Δθ) is large, there can be a case in which the attenuation of a required angle component becomes large.

When in the characteristic diagram C3 of FIG. 3(c), the integral value resetting value Δθa among the three integral value resetting values having the following relation: Δθa>Δθb>Δθc is set up as the integral value resetting value (Δθ), and the integral value resetting processing is carried out by using this Δθa, the deviation of the roll angle θv on which the integration processing is performed in this way from the actual roll angle of a vehicle is eliminated, and the characteristic C2b of FIG. 3(b) can be acquired.

In contrast, the integral value resetting value (Δθ) is related to a holding time period during which the integral value is held, and the smaller integral value resetting value (Δθ) the longer holding time period during which the integral value is held. Furthermore, as the integral value resetting value becomes smaller, the detection accuracy of the roll angle is improved and the tilt angle detecting apparatus for vehicle becomes more desirable as an apparatus which detects the roll angle.

Therefore, the integral value resetting value (Δθ) has to be reduced to a small value as much as possible. By removing the unnecessary component, such as noise, from the output signal of the angular velocity sensor in advance, and then performing the integration processing on the signal from which the unnecessary component has been removed, the integral value resetting value (Δθ) can be reduced, and the deviation of the roll angle θv on which the integration processing is performed from the actual roll angle of a vehicle can be suppressed even if the integral value resetting value (Δθ) is small.

The above explanation is the background which results in the structure of FIG. 1, and the tilt angle detecting apparatus for vehicle in accordance with the present invention is aimed at operating in order to attain the following requirements (1) and (2) which are mutually contradictory.

(1) To hold the detected roll angle. For this purpose, it is necessary to lengthen the holding time period during which the integral value is held.

(2) To prevent the divergence of the integral value due to the unnecessary angular velocity component in a direction of another axis which occurs when the vehicle 11 is making a turn along a spiral road, a curve of a mountain road, or the like while the vehicle 11 is inclined in the direction of the length thereof, or an unnecessary component outputted from the angular velocity sensor, such as a drift component or noise, thereby preventing an error from occurring in the calculated roll angle with respect to the actual roll angle of a vehicle.

Next, the operation of the tilt angle detecting apparatus for vehicle shown in FIG. 1 will be explained with reference to FIG. 4.

Figure 4:
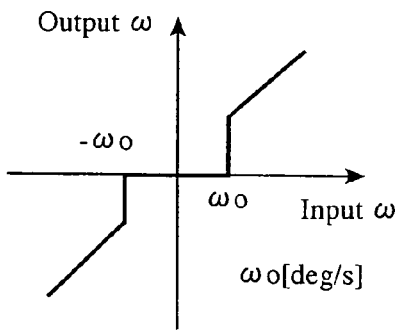
FIG. 4 is a diagram for explaining the operation of the tilt angle detecting apparatus for vehicle in accordance with Embodiment 1 of the present invention.
Figure 4:
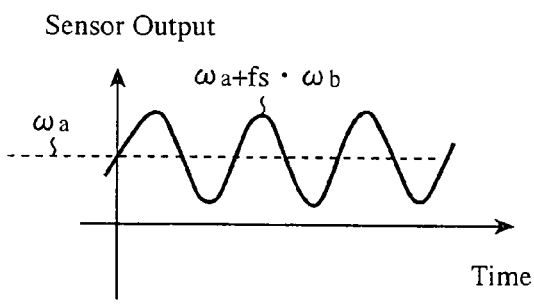
Figure 4:
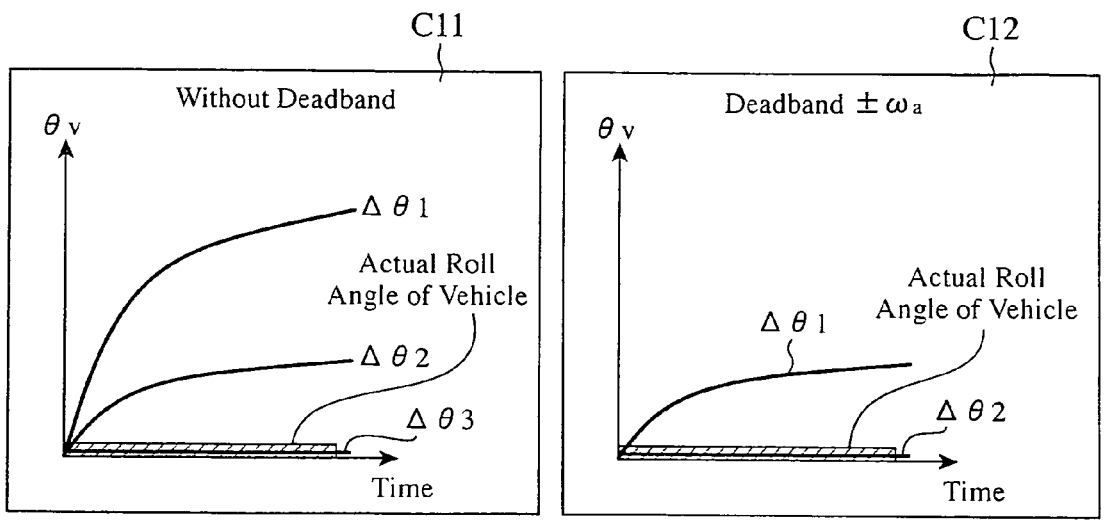

FIG. 4 is a diagram for explaining the operation of the tilt angle detecting apparatus for vehicle shown in FIG. 1, FIG. 4(a) is a diagram showing the input-output behavioral characteristics of the unnecessary component removing means 2, FIG. 4(b) is a waveform chart showing an example of the angular velocity detecting signal outputted from the angular velocity sensor 1 at the time when the vehicle is travelling along a spiral road, and FIG. 4(c) is an explanatory drawing of the resetting of the integral value.

FIG. 4(a) shows a relation between an output angular velocity ω (vertical axis) (referred to as an "output ω" from here on) and an input angular velocity ω (horizontal axis) (referred to as an "input ω" from here on), and a region from −ωo to +ωo in the figure (the sign "+" will be omitted hereafter) shows the deadband of the input ω in the unnecessary component removing means 2 and the unnecessary component removing means 2 makes the output ω be zero to remove unnecessary component, such as noise, with the deadband. Hereafter, "ωo" is referred to as a first angular velocity value.

With the above-mentioned deadband, the unnecessary component removing means can alternatively attenuate the input ω to remove an unnecessary component, such as noise. In the following explanation, the case in which the unnecessary component removing means makes the output ω be zero with the deadband will be explained.

In contrast to the above-mentioned deadband, a region in which the input ω>ωo or the input ω<(−ωo) is a passband, the unnecessary component removing means allows a component of the angular velocity detecting signal whose level exceeds the range of levels which the unnecessary component removing means removes with the above-mentioned deadband, and outputs the output ω having the same level as the input ω.

FIG. 4(b) is an example of the waveform chart of the sensor output which includes the angular velocity ωa which is a direct current (DC) component and which varies according to ωa+fs·(angular velocity ωb) with its center being at this angular velocity ωa, and the sensor output is the input ω inputted to the unnecessary component removing means 2. Assume ωa>ωb.

The characteristic diagram C11 of FIG. 4(c) is a diagram showing an example of a state of the resetting of the integral value, in which the horizontal axis shows a time (ms) and the vertical axis shows the roll angle θv (deg), and shows a case in which the unnecessary component removing means does not have the deadband ωo of the unnecessary component removing means 2, and a state in which the resetting processing has been carried out with the integral value resetting values Δθ1, Δθ2, and Δθ3 (Δθ1<Δθ2<Δθ3) (deg/sec) being defined as parameters.

The characteristic diagram C12 of FIG. 4(c) shows a state in which the deadband ωo of the characteristic diagram C11 is the one of ±ωa (deg/sec) of FIG. 4(b), and the resetting processing has been carried out with the same integral value resetting values Δθ1 and Δθ2 (deg/sec) as those in the characteristic diagram C11 being defined as parameter.

The angular velocity detecting signal (=the input ω) which is outputted from the angular velocity sensor 1 is inputted to the unnecessary component removing means 2 having an input-output behavioral characteristic shown in FIG. 4(a). This input-output behavioral characteristic has the deadband having the region from −ωo to ωo, as mentioned above, for the input whose value falls within the region of |input ω|<=ωo, the unnecessary component removing means makes its output ω be 0 to remove an unnecessary component, such as a component in the direction of another axis or offset noise. This removal of the unnecessary component makes it possible to reduce the value to which the integral value is reset by the integral value resetting means 4.

In contrast, a component which satisfies the following relation: the input ω>ωo or the input ω<(−ωo) is the one in the passband, and, in either case, the unnecessary component removing means makes its output ω be equal to the input ω. This signal showing the output ω which is allowed to pass through the unnecessary component removing means 2 is inputted to the arithmetic processing means 3, and is subjected to the integration processing in this arithmetic processing means. The signal on which the integration processing has been performed is sent out, as a signal showing the angle θs (deg), to the integral value resetting means 4. This signal showing the angle θs which is sent out to the integral value resetting means 4 is set in such a way as to has the following relation: θs>0 or θs<0 according to the polarity (±) of the input ω.

The signal showing the angle θs (deg) which is acquired through the integration processing by the above-mentioned arithmetic processing means 3 includes a large error because the signal is obtained by simply integrating the output ω, as mentioned above, and therefore deviates from the actual roll angle of a vehicle. In order to suppress this deviation of the angle θs acquired through the integration processing from the actual roll angle of a vehicle, the integral value resetting means 4 performs a process of resetting the integral value to zero. However, it is necessary to, in the process of resetting the integral value to zero, set the integral value resetting value to an appropriate value according to the degree of the deviation of the angle θs acquired through the integration processing from the actual roll angle of a vehicle, as mentioned above.

There can be a view of the characteristic diagram C11 of and the characteristic diagram C12 of FIG. 4(c) which show a state of the resetting of the integral value to zero in the above-mentioned integral value resetting means 4 that the integral value resetting value which makes the integral value (deg) in the vertical axis of the characteristic diagram be 0 is the appropriate one which suppresses the deviation of the angle θs acquired through the integration processing from the actual roll angle of a vehicle. Therefore, in the characteristic diagram C11 in which unnecessary component removing means includes no deadband, the angle θs acquired through the integration processing deviates from the actual roll angle of a vehicle unless the integral value resetting value is set to Δθ3, whereas in the characteristic diagram C12 in which the deadband is the region of ±ωa, the integral value is held for a long time by setting the integral value resetting value to Δθ2 which is smaller than Δθ3, the deviation of the angle θs acquired through the integration processing from the actual roll angle of a vehicle can be eliminated.

As previously explained, the setting of the integral value resetting value is also related to the setting of the deadband of the unnecessary component removing means 2. Therefore, the above-mentioned appropriate integral value resetting value is grasped beforehand for every vehicle through measurement or the like on the basis of the condition of the set-up deadband (±ωa), and the integral value resetting value which has been grasped is preset, as a fixed value, to the integral value resetting means 4. This set-up fixed integral value resetting value is, for example, the above-mentioned Δθ2.

The integral value resetting means 4 to which the above-mentioned fixed value Δθ2 is set, when the signal θs sent out from the arithmetic processing means 3 satisfies "θs>0", calculates and outputs θv according to θv=θs−Δθ2, whereas when the signal θs satisfies "θs<0", the integral value resetting means calculates and outputs θv according to θv=θs+Δθ2. This θv outputted from the integral value resetting means 4 is a signal showing the actual roll angle of a vehicle, and the required roll angle component can be extracted from this signal.

As mentioned above, the tilt angle detecting apparatus for vehicle in accordance with this Embodiment 1 is constructed in such a way as to remove an unnecessary component included in the angular velocity detecting signal (the input ω) inputted from the angular velocity sensor 1 with the deadband of the unnecessary component removing means 2, perform integration processing on the angular velocity detecting signal (the output ω) which is allowed to pass through the passband of the unnecessary component removing means 2 and which is outputted from this unnecessary component removing means, perform the process of resetting the integral value to zero by using the fixed integral value resetting value which is determined in such a way as to be suited to the above-mentioned deadband after the integration processing, and output a signal showing the roll angle θv of the vehicle. With the removal of the unnecessary component, such as an angular velocity component in a direction of another axis or offset noise, using the unnecessary component removing means 1, and the process of resetting the integral value to zero, the integral value which is obtained through the integration processing can be held for a long time without diverging and the roll angle θv of the vehicle can be detected correctly.

In addition, there is no necessity to add peripheral equipment and the roll angle θv of the vehicle can be detected with the simple structure.

Embodiment 2

Figure 5:
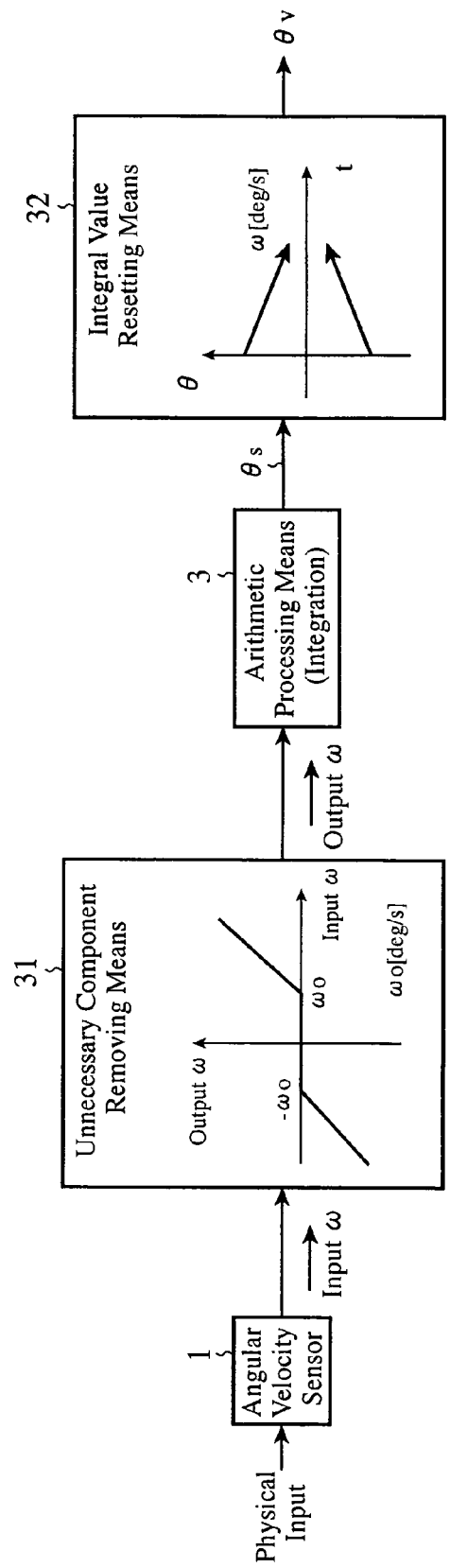
FIG. 5 is a block diagram showing the structure of a tilt angle detecting apparatus for vehicle in accordance with Embodiment 2 of the present invention.

FIG. 5 is a block diagram showing the structure of a tilt angle detecting apparatus for vehicle in accordance with Embodiment 2 of the present invention. The same components as those shown in FIG. 1 are designated by the same reference numerals as those shown in the figure.

In FIG. 5, the structure of this FIG. 5 differs from that of FIG. 1 in that the tilt angle detecting apparatus is provided with an unnecessary component removing means 31 whose input-output behavioral characteristics differ from those of the unnecessary component removing means 2 of FIG. 1, and an integral value resetting means 32 to which an integral value resetting value different from that set to the integral value resetting means 4 of FIG. 1 is set. Hereafter, these differences will be mainly explained, and the explanation about those of FIG. 1 designated by the same reference numerals will be omitted.

The input-output behavioral characteristics of the unnecessary component removing means 31 differ from those of the unnecessary component removing means 2 of FIG. 1 in that, as illustrated in the block of the unnecessary component removing means, when the input has a value which does not fall within the deadband (±ωo), i.e., which satisfies the following relation: "|input ω|>ωo", the unnecessary component removing means subtracts ωo which is an offset from the input to generate an output ω. The output ω which is obtained by subtracting this offset ωo from the input is integrated by the arithmetic processing means 3. Hereafter, the above-mentioned difference in the input/output relation will be concretely explained.

As mentioned above, the unnecessary component removing means 2 of FIG. 1 makes the output ω be equal to the input ω in the case of the input ω>ωo, makes the output ω be equal to 0 in the case of |input ω|<=ωo, and makes the output ω be equal to the input ω in the case of the input ω<(−ωo).

In contrast with this, the unnecessary component removing means 31 makes the output ω be equal to (the input ω−ωo) in the case of the input ω>ωo, makes the output ω be equal to 0 in the case of |input ω|<=ωo, and makes the output ω be equal to (the input ω+ωo) in the case of the input ω<(−ωo).

An advantage in making the unnecessary component removing means operate according to the above-mentioned input-output behavioral characteristics will be explained with reference to FIG. 6.

Figure 6:
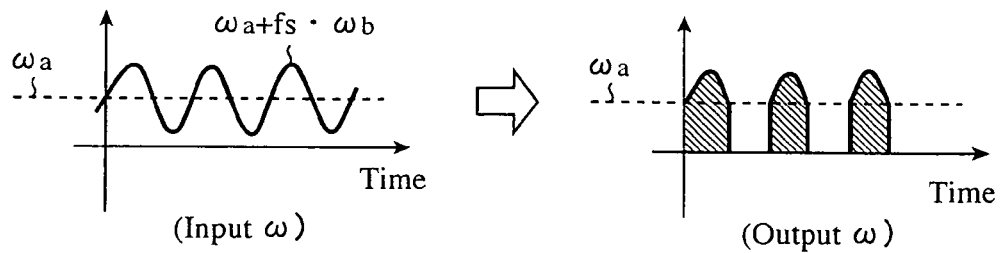
FIG. 6 is a diagram for explaining the operation of the tilt angle detecting apparatus for vehicle in accordance with Embodiment 2 of the present invention.
Figure 6:
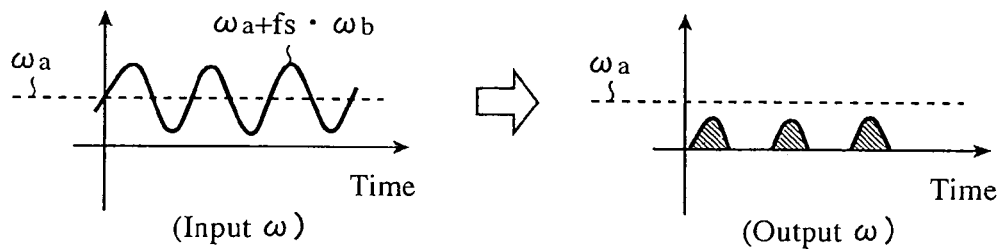
Figure 6:
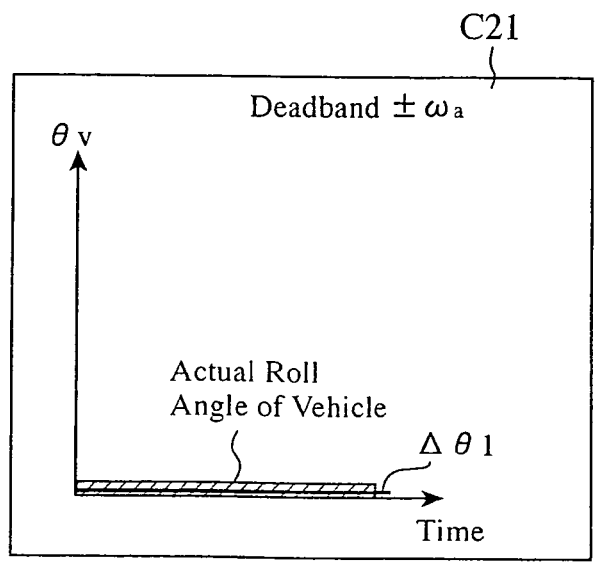

FIG. 6 is a diagram for explaining the operation of the tilt angle detecting apparatus for vehicle shown in FIG. 5, FIG. 6(a) is a diagram showing the input-output behavioral characteristics of the unnecessary component removing means 2 shown in FIG. 1, FIG. 6(b) is a diagram showing the input-output behavioral characteristics of the unnecessary component removing means 31, and FIG. 6(c) is an explanatory drawing of the integral-value resetting.

Furthermore, it is assumed that a waveform chart of the input ω shown in FIGS. 6(a) and 6(b) is the same as that of the angular velocity detecting signal outputted from the angular velocity sensor 1 at the time, as illustrated in above-mentioned FIG. 4(b), when the vehicle is travelling along a spiral road, and the deadband ωo of the unnecessary component removing means 31 is set to be a region of ±ωa (deg/sec) having a waveform shown in FIG. 4(b).

In the case of FIG. 6(a), when a signal (ω) having a waveform as shown in the figure is inputted to the unnecessary component removing means 2, the output ω of the unnecessary component removing means 2 for this input ω includes an unnecessary direct current (DC) component (an offset) ωa which occurs due to the vehicle's travelling along a spiral road. Therefore, the integral value resetting means 4 of FIG. 1 has to perform the integral value resetting processing on up to this unnecessary dc component ωa to remove the unnecessary dc component ωa, and it is therefore necessary to increase the integral value resetting value. As mentioned above, the smaller integral value resetting value, the longer holding time period during which the integral value is held and hence the detection accuracy of the roll angle θv can be improved desirably. Therefore, it is desirable that the integral value resetting value should be smaller as much as possible.

In contrast, in the case of FIG. 6(b), in the output ω of unnecessary component removing means 31, the unnecessary direct current (DC) component (the offset) ωa is subtracted and removed from the input ω. Therefore, the integral value resetting means 32 has only to perform the integral value resetting processing on the output ω from which the DC component ωa has been subtracted. As a result, because the integral value resetting set to the integral value resetting means 32 can be reduced and the holding time period during which the integral value is held can be increased, the detection accuracy of the roll angle θv can be improved.

In FIG. 6(c), a characteristic diagrams C21 is similar to the characteristic diagram C12 shown in FIG. 4(c), the deadband ωo of the unnecessary component removing means 31 is the region of ±ωa (deg/sec) which is the same as that of this characteristic diagram C12 and a state where the resetting processing is carried out by using the integral value resetting value Δθ1 (deg/sec) is shown. This integral value resetting value Δθ1 is the same as those of the characteristic diagram C11 and the characteristic diagram C12 shown in FIG. 4(c), and has the following relation: Δθ1<Δθ2<Δθ3, as mentioned above.

As shown in FIG. 6(c), the deviation of the calculated roll angle from the actual roll angle of a vehicle can be eliminated by performing the process of resetting the integral value to zero by using the integral value resetting value Δθ1.

In contrast with this, when, for example, there is no deadband in the unnecessary component removing means 31, there is provided a characteristic diagram which is the same as the characteristic diagram C11 shown in FIG. 4(c), the calculated roll angle deviates from the actual roll angle of a vehicle unless the integral value resetting value is set to Δθ3.

It is clear from comparison between the characteristic diagram C21 shown in FIG. 6(c) and the characteristic diagram C11 and the characteristic diagram C12 shown in FIG. 4(c) that the deviation of the calculated roll angle from the actual roll angle of a vehicle can be eliminated by selecting, as the integral value resetting value, the smallest one Δθ1 from among Δθ1, . . . , and Δθ3. Furthermore, the reduction in the integral value resetting value further improves the advantage in holding the integral value as compared with the structure of FIG. 1.

Thus, the reason why the integral value resetting value can be reduced is that, as mentioned above, the unnecessary component removing means 31 sets up the deadband, and subtracts the unnecessary direct current (DC) component (offset) ωa from the input to remove the unnecessary direct current component.

The above-mentioned integral value resetting value Δθ1 is grasped beforehand for every vehicle through measurement or the like on the basis of the condition of the set-up deadband (±ωa), and the integral value resetting value which has been grasped is preset, as a fixed value, to the integral value resetting means, as in the case of the structure of FIG. 1.

The integral value resetting means 32 to which the above-mentioned small fixed value Δθ1 is set, when the signal θs sent out from the arithmetic processing means 3 satisfies "θs>0", calculates and outputs θv according to θv=θs−Δθ1, whereas when the signal θs satisfies "θs<0", the integral value resetting means calculates and outputs θv according to θv=θs+Δθ1. This θv outputted from the integral value resetting means 4 is a signal showing the actual roll angle of a vehicle, and the roll angle component whose accuracy is improved as compared with the case of the structure shown in FIG. 1 can be extracted from this signal.

As mentioned above, the tilt angle detecting apparatus in accordance with this Embodiment 2 is constructed in such a way as to, when the input ω has a value exceeding the deadband, subtract the direct current (DC) component from the input to generate the output ω using the unnecessary component removing means 31, perform the integration processing on this output ω using the arithmetic processing means 3, perform the process of resetting the integral value to zero by using the fixed integral value resetting value which is determined in such a way as to be suited to the above-mentioned deadband after the integration processing, and output a signal showing the roll angle θv of the vehicle. Therefore, the increase in the integral value can be suppressed, and the integral value resetting means 32 has only to perform the integral value resetting processing on the output ω from which the dc component has been subtracted. As a result, the integral value resetting which is set to the integral value resetting means 32 can be reduced, and the holding time period during which the integral value is held can be increased as compared with Embodiment 1 and hence the detection accuracy of the roll angle θv can be improved.

Embodiment 3

Figure 7:
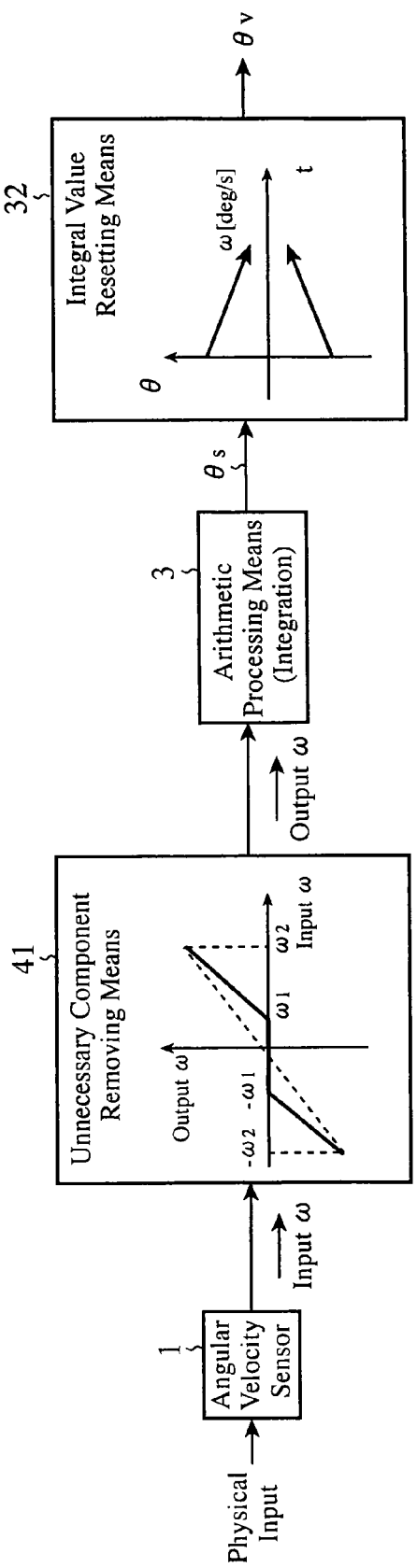
FIG. 7 is a block diagram showing the structure of a tilt angle detecting apparatus for vehicle in accordance with Embodiment 3 of the present invention.

FIG. 7 is a block diagram showing the structure of a tilt angle detecting apparatus for vehicle in accordance with Embodiment 3 of the present invention. The same components as those shown in FIG. 1 or 5 are designated by the same reference numerals as those shown in the figure.

In FIG. 7, the structure of this FIG. 7 differs from that of FIG. 5 in that the tilt angle detecting apparatus is provided with an unnecessary component removing means 41 whose input-output behavioral characteristics differ from those of the unnecessary component removing means 31 of FIG. 5. Hereafter, this difference will be mainly explained, and the explanation about the operations and so on of those of FIG. 1 or 5 designated by the same reference numerals will be omitted.

The input-output behavioral characteristics of the unnecessary component removing means 41 differ from those of the unnecessary component removing means 31 of FIG. 5 in the following point.

The unnecessary component removing means 31 of FIG. 5, when an input component has a value which does not fall within the deadband (±ωo), i.e., which satisfies the following relation: "|input ω|>ωo", subtracts ωo which is an offset from the input component in the same way to generate an output ω. In contrast with this, the unnecessary component removing means 41, when the input component has a value exceeding the deadband, gradually reduces the subtraction amount (the amount of offset removal) from its maximum with increase in the input ω to generate the output ω.

In the unnecessary component removing means 41, the level of the unnecessary dc component (the offset component) which occurs in a case in which the vehicle is travelling along a spiral road, which is the worst case, is estimated, and a region of this level is defined as the deadband. Hereafter, the setting level of this deadband is expressed as ω1, and a maximum output level of the angular velocity sensor 1 is expressed as ω2.

On the above-mentioned condition, in the case of |input ω|<=ω1, the subtraction amount is set to its maximum and the output ω is made to be 0. In the case of |input ω|=ω2 (maximum output level), the subtraction amount is set to "0," the output ω is made to be the input ω (=ω2).

Furthermore, in the case of ω2>input ω>ω1 or (−ω2)<input ω<(ω1), the subtraction amount is made to gradually decrease, and, in the case of ω2>input ω>ω1, the output ω is determined according to the following "equation 1."

$$\text{Output } \omega = \{\omega 2/(\omega 1 - \omega 2)\} \cdot (\omega 1 - \text{input } \omega) \quad \text{(equation 1)}$$

Furthermore, in the case of $(-\omega 2)<$input $\omega<(-\omega 1)$, the output $\omega$ is determined according to the following "equation 2."

$$\text{Output } \omega = \{\omega 2/(\omega 1 - \omega 2)\} \cdot (-\omega 1 - \text{input } \omega) \quad \text{(equation 2)}$$

As previously explained, for a region including many unnecessary components in which the angular velocity is small in the input-output behavioral characteristics of the unnecessary component removing means 41, the subtraction amount is increased, whereas for a region including many actual rollover components in which the angular velocity is large in the input-output behavioral characteristics, the subtraction amount is decreased, so that the rollover component of the vehicle can be determined with a high degree of precision.

As mentioned above, the tilt angle detecting apparatus in accordance with this Embodiment 2 is constructed in such a way as to, when the input $\omega$ has a value exceeding the deadband, gradually reduces the subtraction amount from its maximum with increase in the input $\omega$ to generate the output $\omega$, perform the integration processing on this output $\omega$ using the arithmetic processing means 3, perform the process of resetting the integral value to zero by using the fixed integral value resetting value which is determined in such a way as to be suited to the above-mentioned deadband after the integration processing, and output a signal showing the roll angle $\theta v$ of the vehicle. Therefore, for the region including many unnecessary components in which the angular velocity is small, the subtraction amount is increased, whereas for the region including many actual rollover components in which the angular velocity is large, the subtraction amount is decreased. As a result, the rollover component of the vehicle can be determined with a high degree of precision and hence the detection accuracy of the roll angle $\theta v$ can be further improved.

Embodiment 4

Figure 8:
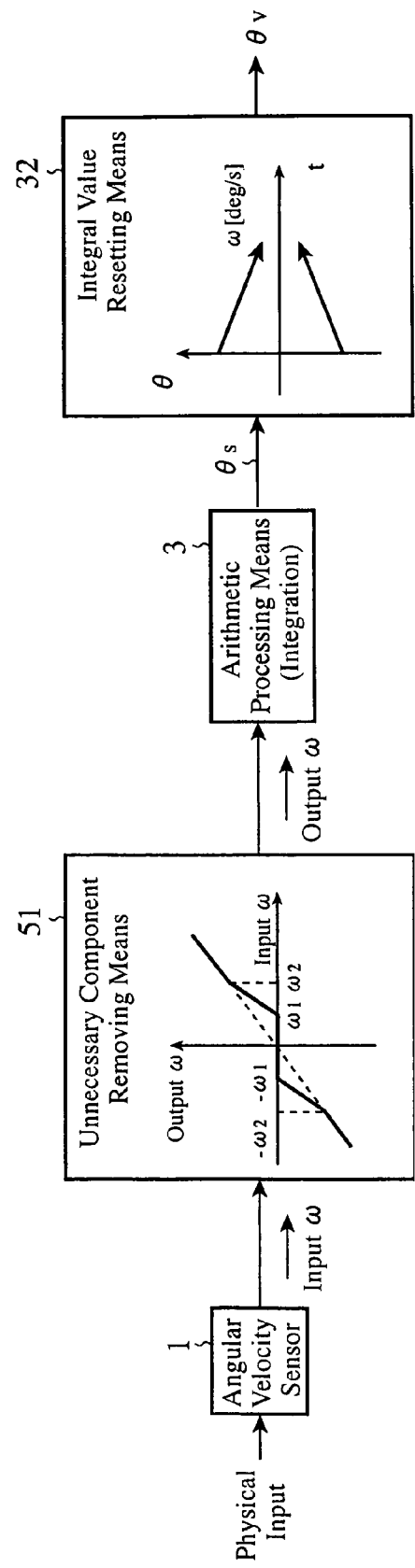
FIG. 8 is a block diagram showing the structure of a tilt angle detecting apparatus for vehicle in accordance with Embodiment 4 of the present invention.

FIG. 8 is a block diagram showing the structure of a tilt angle detecting apparatus for vehicle in accordance with Embodiment 4 of the present invention. The same components as those shown in FIG. 1, 5, or the like are designated by the same reference numerals as those shown in the figure.

In FIG. 8, the structure of this FIG. 8 differs from that of FIG. 5 or the like in that the tilt angle detecting apparatus is provided with an unnecessary component removing means 51 having different input-output behavioral characteristics. This unnecessary component removing means 51 has input-output behavioral characteristics which are a combination of the input-output behavioral characteristics of the unnecessary component removing means 2, 31, and 41 in accordance with above-mentioned Embodiment 1 (FIG. 1), those of the unnecessary component removing means 31 in accordance with Embodiment 2 (FIG. 5), and those of the unnecessary component removing means 41 in accordance with Embodiment 3 (FIG. 7).

Hereafter, the input-output behavioral characteristics of the unnecessary component removing means 51 which differ from those in accordance with any of above-mentioned Embodiments will be mainly explained, and the explanation about the operations and so on of those of FIG. 1, 5, or the like designated by the same reference numerals will be omitted.

Hereafter, the input-output behavioral characteristics of the unnecessary component removing means 51 will be explained with reference to FIG. 9.

Figure 9:
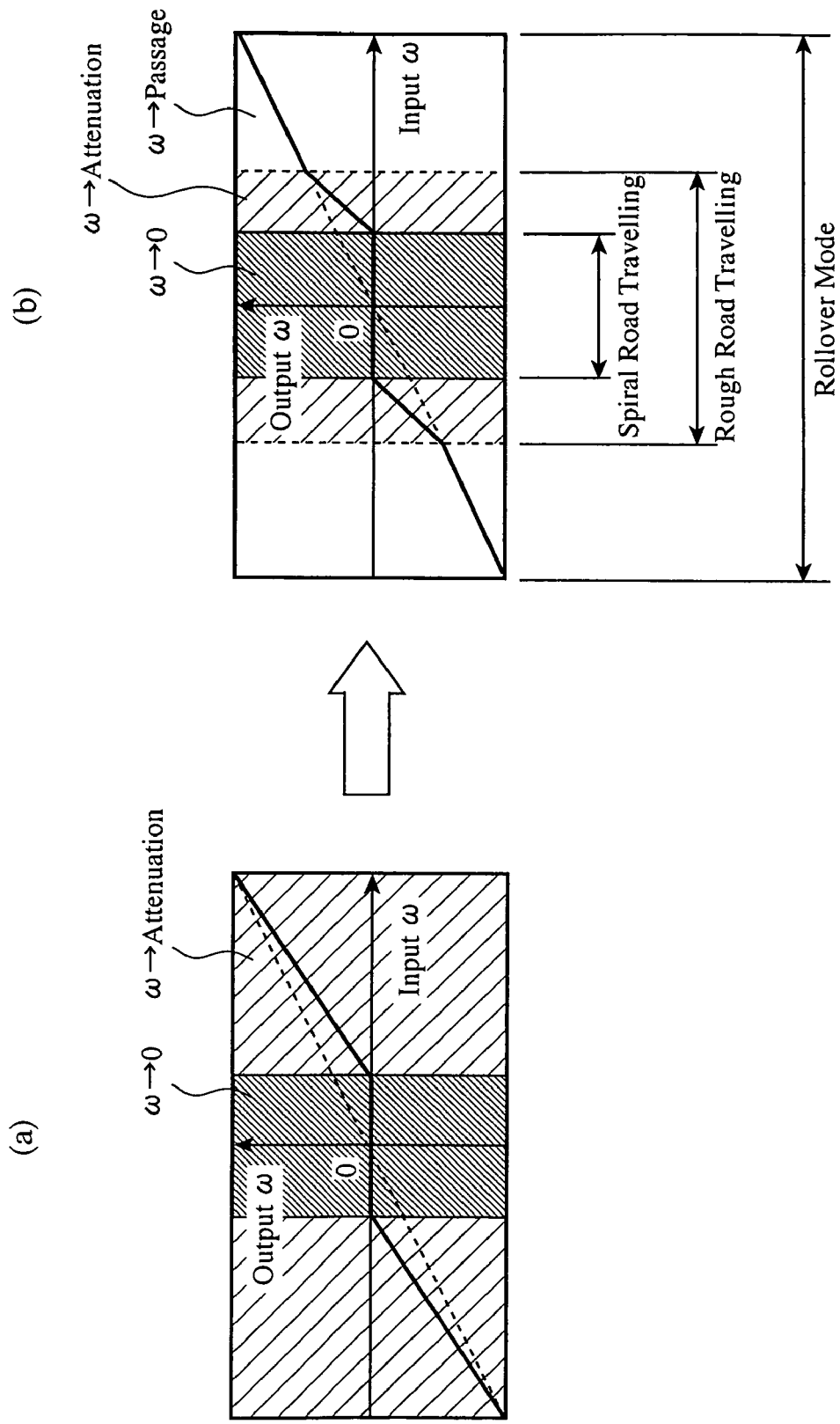
FIG. 9 is an explanatory drawing of the input-output behavioral characteristics of an unnecessary component removing means in the tilt angle detecting apparatus for vehicle in accordance with Embodiment 4 of the present invention.

FIG. 9 is an explanatory drawing of the input-output behavioral characteristics of the unnecessary component removing means 51, FIG. 9(a) is a diagram showing the input-output behavioral characteristics of the unnecessary component removing means 41 in accordance with Embodiment 3 (FIG. 7), and FIG. 9(b) is a diagram showing the input-output behavioral characteristics of the unnecessary component removing means 51 in accordance with this Embodiment 4 (FIG. 8).

As mentioned above, the unnecessary component removing means 41 of FIG. 7 whose input-output behavioral characteristics are shown in FIG. 9(a), when the input component has a value exceeding the deadband, gradually reduces the subtraction amount (the amount of offset removal) from its maximum with increase in the input $\omega$ to generate the output $\omega$. More specifically, the input-output behavioral characteristics diagram is divided into the following two regions: the region in which the offset is subtracted from the input and the output $\omega$ is made to be zero, and the region in which the subtraction amount is gradually reduced (attenuated) from its maximum.

In contrast with this, in the unnecessary component removing means 51 in accordance with this Embodiment 4 whose input-output behavioral characteristics are shown in FIG. 9(b), in addition to the above-mentioned two regions, a region in which there is a one-to-one correspondence (output $\omega$=input $\omega$) between the input level and the output level is disposed, and the input-output behavioral characteristics diagram is divided into the three regions. More specifically, as shown in FIG. 9(b), a spiral road traveling mode corresponds to the region in which the offset is subtracted from the input in such a way that the output $\omega$ is made to be zero, a rough road traveling mode in which the vehicle is travelling a rough road or the like corresponds to the region (the attenuation band) in which the subtraction amount is gradually reduced (attenuated) from its maximum, and a rollover mode corresponds to the region in which there is a one-to-one correspondence (output $\omega$=input $\omega$) between the input level and the output level.

Among these regions, the region of the spiral road traveling mode in which the offset is subtracted from the input in such a way that the output $\omega$ is made to be zero is the one in accordance with Embodiment 2 (the unnecessary component removing means 31), the region of the rough road traveling mode in which the subtraction amount is gradually reduced (attenuated) from its maximum is the one in accordance with Embodiment 3 (the unnecessary component removing means 41), and the region of the rollover mode in which there is a one-to-one correspondence (output $\omega$=input $\omega$) between the input level and the output level is the one in accordance with Embodiment 1 (the unnecessary component removing means 2).

As mentioned above, the deadband is set up in such a way that the spiral road traveling mode and a case in which the angular velocity component from angular velocity sensor 1 has noise level are usually judged as a normal traveling state, in the region in which the angular velocity is large, the angular velocity component is attenuated and the current state is judged as a state in which the roll component and a noise component coexist, like a rough road traveling state, and, in the region in which the angular velocity is large, the angular velocity component is outputted without being attenuated and the current state is judged as the rollover mode.

Furthermore, in the region corresponding to the above-mentioned rough road traveling mode, the ratio of the effective component (the roll component) is adjusted according to the magnitude of the angular velocity which occurs.

By using the above-mentioned input-output behavioral characteristics, the amount of resetting of the process of resetting the integral value by the integral value resetting means 32 can be reduced, and the long-time holding of the integral value showing the roll angle can be attained. As a result, the accuracy of the detection of the roll angle showing a rollover of the vehicle can be improved, and this results in more-accurate rollover judgment.

As mentioned above, in accordance with this Embodiment 4, the input-output behavioral characteristic of the unnecessary component removing means 51 is divided into the following three regions: the region in which the dc component is subtracted from the input and the output ω is made to be zero; the region in which the subtraction amount is gradually reduced (attenuated) from its maximum; and the region in which there is a one-to-one correspondence (output ω=input ω) between the input level and the output level, and, in the spiral road traveling mode, the dc component is subtracted from the input in such a way that the output ω is made to be zero, in the rough road traveling mode in which the vehicle is travelling a rough road or the like, the subtraction amount is gradually reduced from its maximum, and, in the rollover mode, there is a one-to-one correspondence (output ω=input ω) between the input level and the output level. Therefore, the deadband is set up for a case in which the angular velocity component has noise level and a spiral road traveling state, in a rough road traveling state in which the angular velocity is large and the roll component and a noise component coexist, the subtraction amount is gradually reduced from its maximum according to the input ω, and, in the rollover mode in which the angular velocity is large, the angular velocity component is outputted without being attenuated. Therefore, the amount of resetting of the process of resetting the integral value by the integral value resetting means 32 can be reduced, and the long-time holding of the roll angle θv can be attained. As a result, the accuracy of the detection of the roll angle θv showing a rollover of the vehicle can be improved.

Furthermore, in the region corresponding to the above-mentioned rough road traveling mode, the ratio of the effective component (the roll component) can be adjusted according to the magnitude of the angular velocity which occurs.

In addition, with the above-mentioned structure, the peak of the integral value can be further improved in the case of soil trip, embankment, and a lamp test, as compared with the structure of Embodiment 3.

Embodiment 5

Figure 10:
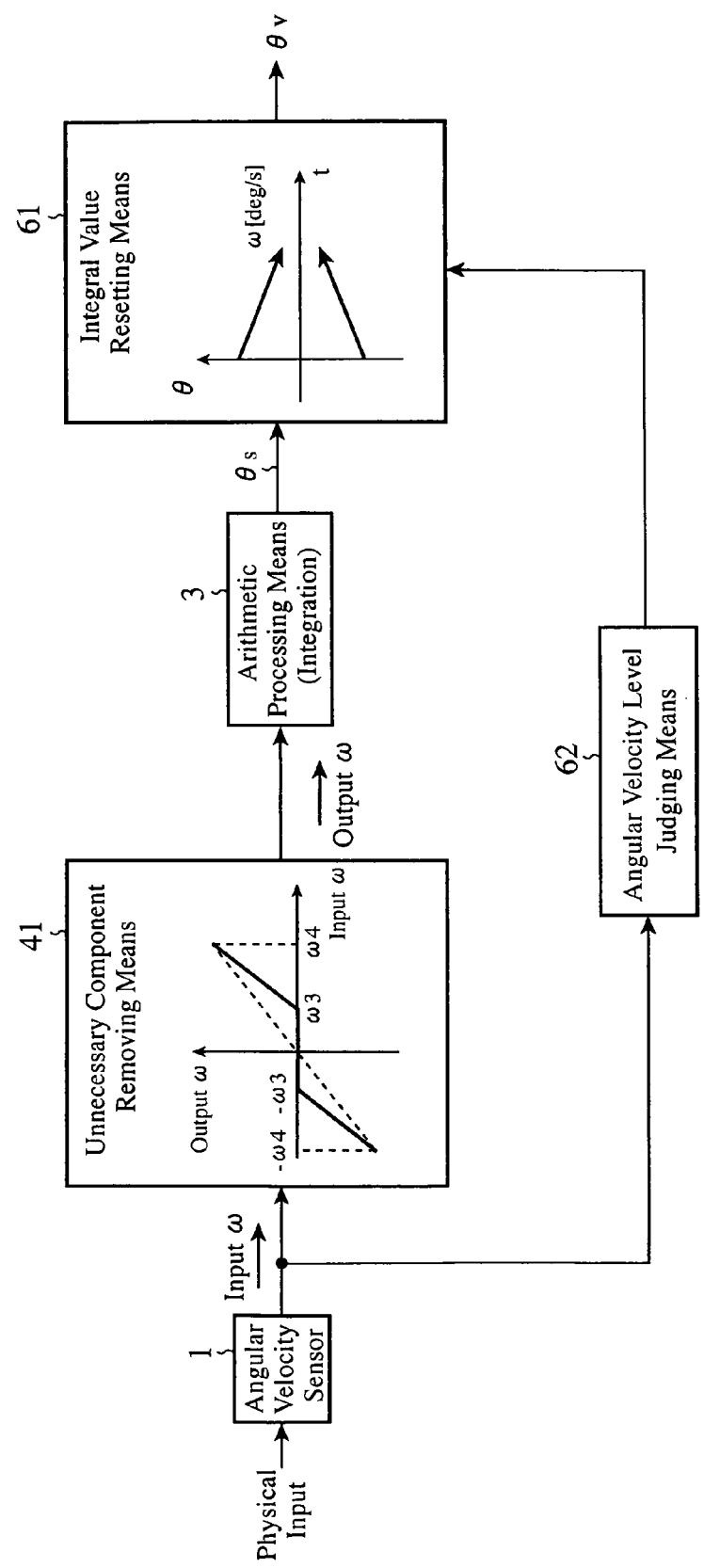
FIG. 10 is a block diagram showing the structure of a tilt angle detecting apparatus for vehicle in accordance with Embodiment 5 of the present invention.

FIG. 10 is a block diagram showing the structure of a tilt angle detecting apparatus for vehicle in accordance with Embodiment 5 of the present invention. The same components as those shown in FIG. 1, 7, or the like are designated by the same reference numerals as those shown in the figure.

In FIG. 10, the structure of this FIG. 10 differs from that of FIG. 7 or the like in that the tilt angle detecting apparatus is provided with an integral value resetting means 61 to which a variable integral value resetting value can be set, and an angular velocity level judging means 62 which sets the integral value resetting value to this integral value resetting means 61 according to a level detected by the angular velocity sensor 1. Hereafter, this difference will be mainly explained, and the explanation about the operations and so on of those of FIG. 1, 7, or the like designated by the same reference numerals will be omitted.

Hereafter, the variableness of the integral value resetting value will be explained with reference to FIG. 11.

Figure 11:
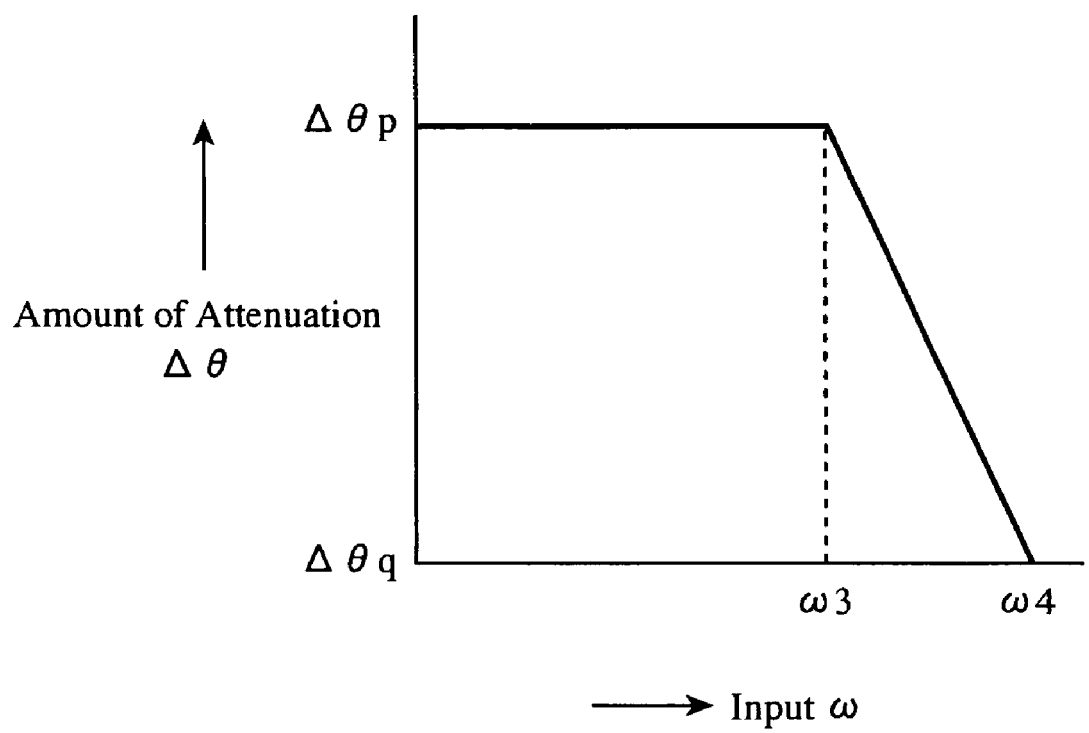
FIG. 11 is an explanatory drawing showing a setting of an integral value resetting value to an integral value resetting means by an angular velocity level judging means in the tilt angle detecting apparatus for vehicle in accordance with Embodiment 5 of the present invention.

FIG. 11 is an explanatory drawing of setting of the integral value resetting value setting to the integral value resetting means 61 by the angular velocity level judging means 62, and shows a relation between the integral value resetting value (a subtraction amount) Δθ (deg/sec) and an angular velocity detecting signal (=input ω) sent out from the angular velocity sensor 1.

In FIG. 11, the angular velocity level judging means sets up an angular velocity ω3 (a second angular velocity value) and an angular velocity ω4 (a third angular velocity value) for the input ω. The ω3 shows the angular velocity having a level which does not appear when the vehicle is travelling along a spiral road or a rough road, and ω4 is taken as the angular velocity of the maximum output level of angular velocity sensor 1. For the ω3 which is set up as mentioned above, the integral value resetting value (the subtraction amount) Δθ is set to be equal to Δθp, and, for the ω4 which is set up as mentioned above, the integral value resetting value (the subtraction amount) Δθ is set to be equal to Δθq.

In this case, Δθp is set to a maximum by assuming the worst case in which the vehicle is travelling along a spiral road, and Δθq is set in such a way that the integral value resetting value (subtraction amount) Δθ becomes equal to 0.

Furthermore, in a region of |input ω|<=ω3, the integral value resetting value (the subtraction amount)Δθ is set to be equal to Δθp.

In addition, in a region of ω4>=|input ω|>ω3, according to a preset reduction characteristic, the integral value resetting value (the subtraction amount) Δθ is set to have a value between zero from the maximum. This reduction characteristic is based on, for example, the following "equation 3."

$$\Delta\theta = \{\Delta\theta p/(-\omega 4 + \omega 3)\} \cdot (|\text{input } \omega| - \omega 4) \quad \text{(equation 3)}$$

Summarizing the above-mentioned settings of the integral value resetting value (the subtraction amount), in a case in which the input ω falls within the range up to ω3, the Δθ is constant and is set to be its maximum Δθp, in a case in which the input ω falls within the range exceeding ω3 and equal to or smaller than ω4, Δθ is gradually reduced according to the above-mentioned "equation 3", and in a case that the input ω is ω4, Δθ is set to 0. Defining correspondences between these cases and the traveling modes, the case in which the input ω falls within the range up to ω3 corresponds to the spiral road traveling mode, the case in which the input ω falls within the range exceeding ω3 and equal to or smaller than ω4 corresponds to the rough road traveling mode, and the case that the input ω is ω4 corresponds to the rollover mode. In addition, because ω4 is the maximum output level of the angular velocity sensor 1, as mentioned above, the input ω does not have a level "equal to or greater than ω4" under this premise even if the vehicle is in the rollover mode.

The angular velocity level judging means 62 sets up the integral value resetting value (subtraction amount) Δθ which is based on above-mentioned FIG. 11 for the integral value resetting means 61 on the basis of the input ω from the angular velocity sensor 1, and the integral value resetting means 61 performs the process of resetting the integral value to zero on the signal showing the angle θs from the arithmetic processing means 3 using the set-up integral value resetting value (the subtraction amount) Δθ. For example, in the case of "θs>0", when the integral value resetting value (subtraction amount) Δθ=Δθp is set up, the integral value resetting means 61 generates its output θv according to θv=θs−Δθp, and, in the case of "θs<0", when the integral value resetting value (the subtraction amount) Δθ=Δθp is set up, the integral value resetting means 61 generates the output θv according to θv=θs+Δθp (substantially subtraction).

Furthermore, when the integral value resetting value (the subtraction amount) Δθ=0 is set up, the integral value resetting means 61 generates the output θv according to θv=θs.

In addition, when the integral value resetting value (the subtraction amount) Δθ is set up in such a way to fall within the following range: 0<Δθ<Δθp, if "θs>0", the integral value resetting means 61 subtracts the set-up value from θs, or, if "θs<0", adds the set-up value to θs, to generate an output θv.

As mentioned above, the tilt angle detecting apparatus in accordance with this Embodiment 5 is provided with the integral value resetting means 61 for which a variable integral value resetting value is set up, the angular velocity level judging means 62 which sets up the integral value resetting value for this integral value resetting means 61 according to the level detected by the angular velocity sensor 1, and, in a state in which the angular velocity (the input ω) is small and the vehicles is not making a turn, performs the process of resetting the integral value to zero by using a large integral value resetting value so as to preventing the integral value from diverging, whereas, in a state in which the angular velocity is large, sets up a small integral value resetting value by assuming that the vehicle is continuing. The integral value can be held for a long time while the integral value can be prevented from diverging due to unnecessary components, and the accuracy of the roll angle detection can be improved and the high-precision roll angle θv can be detected.

Furthermore, because the integral value resetting value is set to its maximum (Δθp) in the spiral road traveling mode in which the input includes unnecessary components, and the integral value resetting value is set to "0" for the rollover region, the integral value can be held for a long time while the integral value can be prevented from diverging, and the high-precision roll angle θv can be detected.

In addition, because for the region of the rough road traveling mode in which an angular velocity component in the direction of another axis coexists, an integral value resetting value midway between zero and the maximum is set up according to the preset reduction characteristic, like the one defined by "equation 3", the ratio of the effective component (the integral value resetting value) can be adjusted according to the magnitude of the angular velocity which occurs, and, as a result, the integral value can be held for a long time while the integral value can be prevented from diverging and the high-precision roll angle θv can be detected.

Furthermore, in the rollover mode in which the angular velocity is large, the integral value resetting value is reduced or set to zero, and the loss of the integral value θs can be reduced.

Embodiment 6

In above-mentioned Embodiments 1 to 5, the tilt angle detecting apparatuses for vehicle are explained. Any of these tilt angle detecting apparatuses for vehicle can be used as a rollover judging apparatus, as will be mentioned below.

Figure 12:
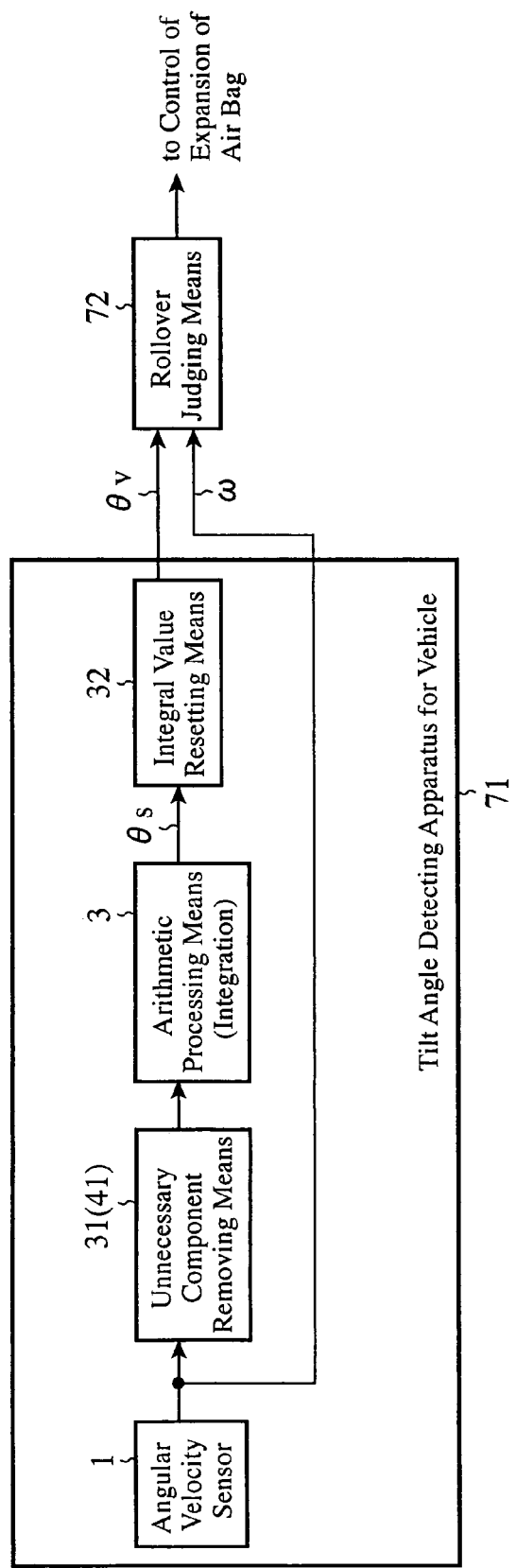
FIG. 12 is a block diagram showing the structure of a rollover judging apparatus in accordance with Embodiment 6 of the present invention.

FIG. 12 is a block diagram showing the structure of a rollover judging apparatus in accordance with Embodiment 6 of the present invention.

In FIG. 12, this rollover judging apparatus has a rollover judging means 72 for the tilt angle detecting apparatus for vehicle 71. Among these apparatuses, the tilt angle detecting apparatus for vehicle 71 can be any of the ones explained in Embodiments 1 to 5. The tilt angle detecting apparatus for vehicle 71 shown in FIG. 12 has the structure in accordance with Embodiment 2 or 3.

Hereafter, the operation of the rollover judging apparatus which uses the tilt angle detecting apparatus for vehicle in accordance with Embodiment 2 will be explained with reference to FIG. 13.

Figure 13:
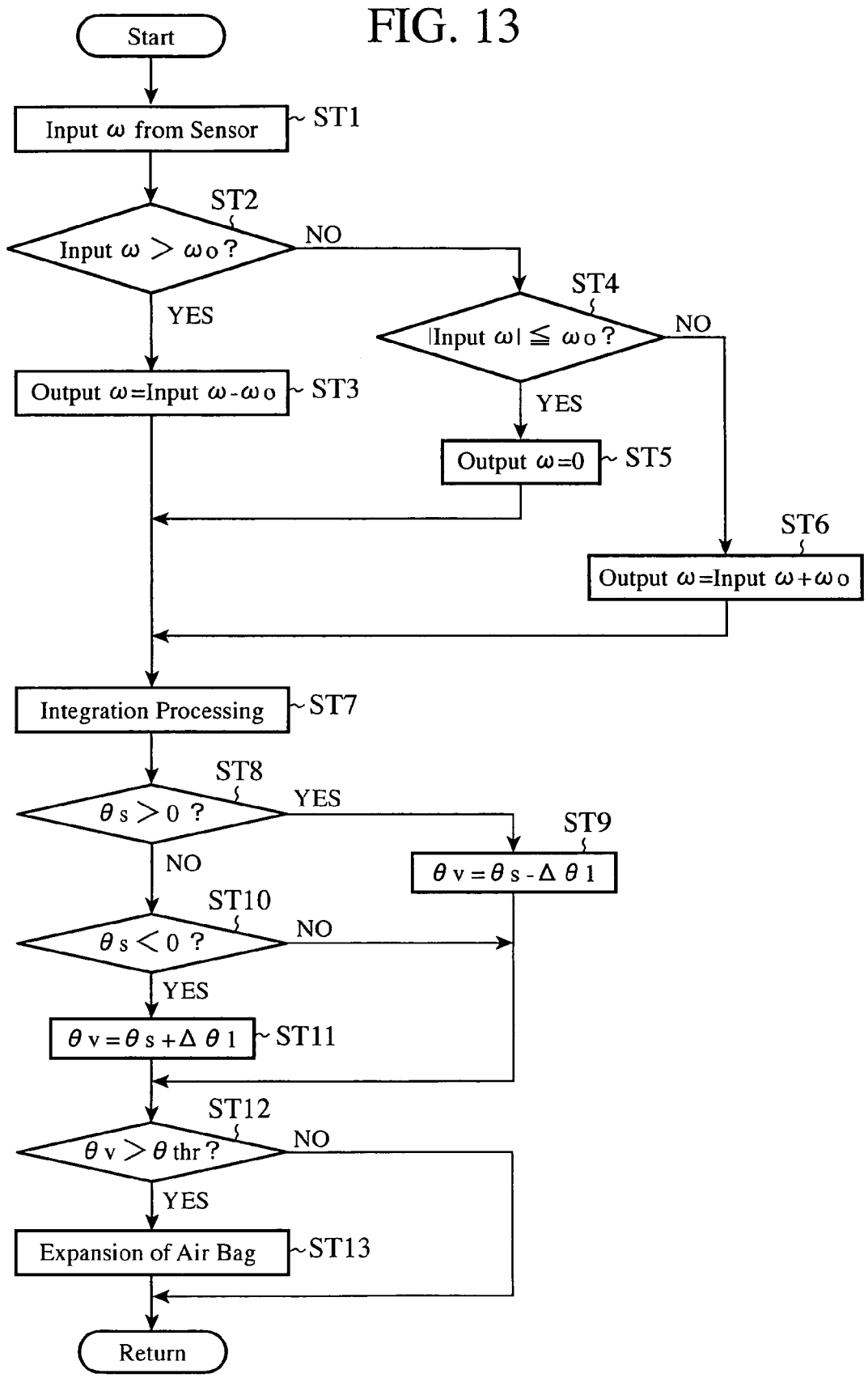
FIG. 13 is a diagram showing a flow of the operation of the rollover judging apparatus in accordance with Embodiment 6 of the present invention.

FIG. 13 is a diagram showing an operation flow of the rollover judging apparatus which uses the tilt angle detecting apparatus for vehicle in accordance with Embodiment 2.

When the "input ω" from the angle detection sensor 1, in step ST1 of FIG. 13, occurs in the unnecessary component removing means 31 of the tilt angle detecting apparatus for vehicle 71, the unnecessary component removing means 31, in a case of, in step ST2, "input ω>ωo" (if Yes in step ST2), outputs an "output ω=input ω−ωo" in step ST3. In contrast, if, in step ST2, "input ω>ωo" is not satisfied (if No in step ST2) and if, in step ST4, "|input ω|<=ωo" is satisfied (if Yes in step ST4), the unnecessary component removing means 31 outputs an "output ω=0" in step ST5. Furthermore, the unnecessary component removing means 31 outputs an "output ω=input ωo+ωo" in step ST6, if, in step ST4, "|input ω|<=ωo" is not satisfied (if No in step ST4). This "if No in step ST4" means "input ω<(−ωo)."

The output ω in above-mentioned step ST3, ST5, or ST6 is sent out to the arithmetic processing means 3. This arithmetic processing means 3, in step ST7, performs integration processing on the output ω and sends out an integrated output θs to the integral value resetting means 32. The integral value resetting means 32, if, in step ST8, "θs>0" is satisfied (if Yes in step ST8), outputs a "roll angle θv=θs−Δθ1" in step ST9. In contrast, the integral value resetting means 32, if "θs>0" is not satisfied (if No in step ST8) and if, in step ST10, "θs<0" is satisfied (if Yes in step ST10), outputs a "roll angle θv=θs+Δθ1" in step ST11.

Furthermore, if, in step ST10, "θs<0" is not satisfied (if No in step ST10), in this case, θs=0, the integral value resetting means 32 outputs a "roll angle θv=0."

The roll angle θv outputted in above-mentioned step ST9, in the case of No in ST10, or in ST1 is sent out to the rollover judging means 72.

The angular velocity detecting signal (ω) from the angular velocity sensor 1, as well as the signal indicating the above-mentioned roll angle θv, is also inputted to this rollover determining means 72, and a threshold θthr which is used as a criterion by which to judge whether the vehicle is rolling over is preset to the rollover determining means 72. The rollover determining means 72 to which both the signal indicating the above-mentioned roll angle θv and the angular velocity detecting signal (ω) are inputted, if, in step ST12, "θv>θthr" is satisfied (if Yes in step ST12), determines "expansion of the air bag" in step ST13.

According to the result of this determination, air bag expansion control (not shown) operates to expand the air bag on the sides of the vehicle to protect the passengers at the time when the vehicle is rolling over.

Applying the above-mentioned explanation to above-mentioned FIG. 2(a) (Embodiment 1), the tilt angle detecting apparatus for vehicle 71 and the rollover judging means 72 serve as the airbag control unit 12 of FIG. 2(a), and, when determining that "θv>θthr" is satisfied, this airbag control unit 12 outputs a driving signal to the air bag 13 on the sides of the vehicle to control and expand the air bag 13.

In contrast with the above-mentioned judgment, when determining that "θv>θthr" is not satisfied in step ST12 (if No in step ST12), the rollover judging means 72 stands by until it receives a new input θv without determining "expansion of the air bag."

Next, the operation of the rollover judging apparatus which uses the tilt angle detecting apparatus for vehicle in accordance with Embodiment 3 will be explained with reference to FIG. 14. FIG. 12 is also used for the explanation.

Figure 14:
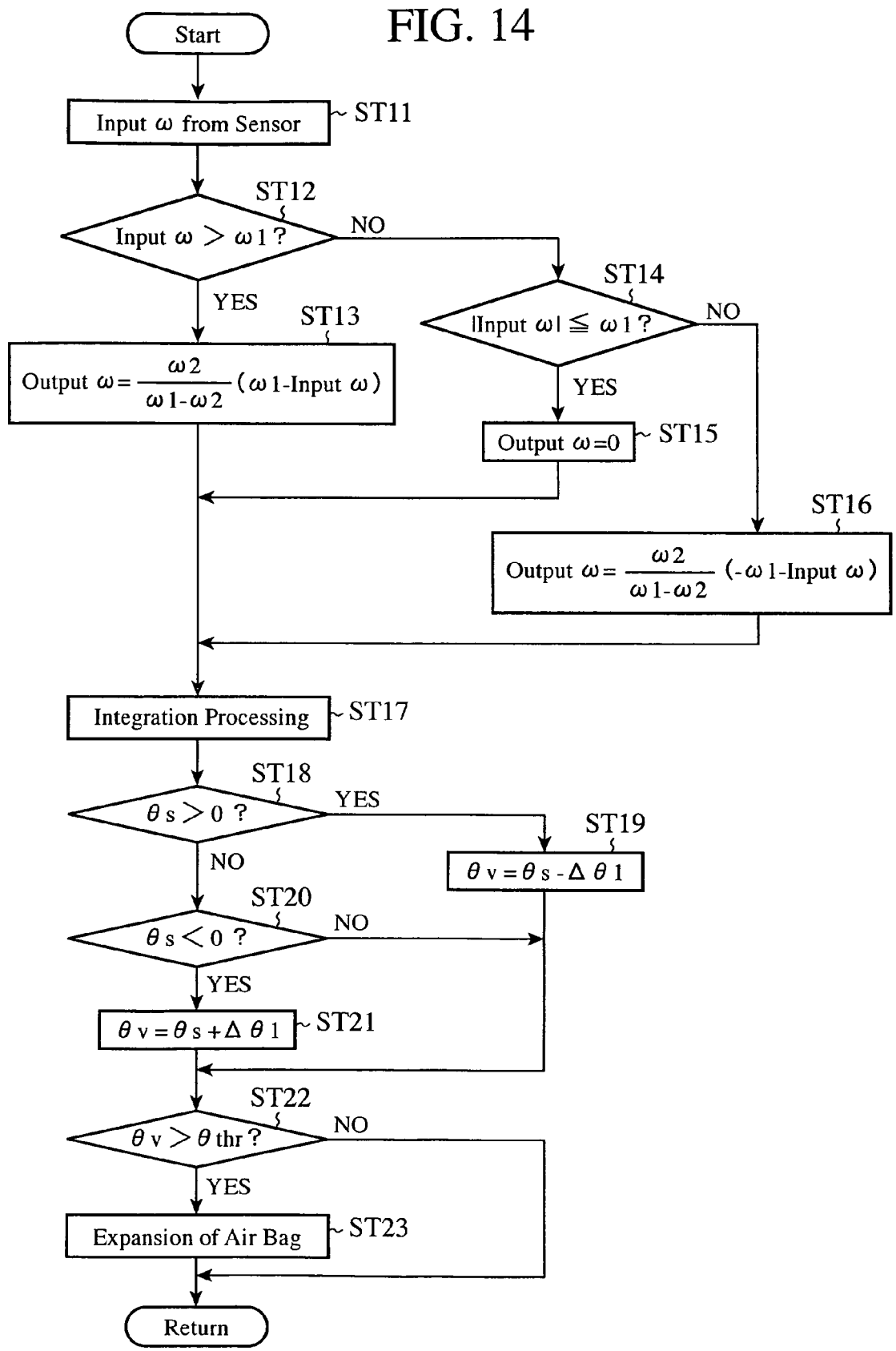
FIG. 14 is a diagram showing a flow of another example of the operation of the rollover judging apparatus in accordance with Embodiment 6 of the present invention.

FIG. 14 is a diagram showing an operation flow of the rollover judging apparatus which uses the tilt angle detecting apparatus for vehicle in accordance with Embodiment 3.

When the "input ω" from the angle detection sensor 1, in step ST11 of FIG. 14, occurs in the unnecessary component removing means 41 of the tilt angle detecting apparatus for vehicle 71, the unnecessary component removing means 41, if, in step ST12, "input ω>ω1" is satisfied (if Yes in step ST12), determines an output ω according to an equation shown in the figure in step ST13. This equation is the above-mentioned "equation 1." In contrast, if, in step ST12, "input ω>ωo" is not satisfied (if No in step ST12) and if, in step ST14, "|input ω|<=ωo" is satisfied (if Yes in step ST14), the unnecessary component removing means 41 outputs an "output w=0" in step ST15.

Furthermore, the unnecessary component removing means 41 determines an output ω according to an equation shown in the figure in step ST16, if, in step ST14, "|input ω|<=ωo" is not satisfied (if No in step ST14). This equation is the above-mentioned "equation 2." This "if No in step ST14" means "input ω<(−ωo)."

The output ω outputted in above-mentioned step ST13, ST15, or ST16 is sent out to the arithmetic processing means 3.

Because, in subsequent steps ST17 to ST23, the same processes as those in steps ST7 to ST13 of FIG. 13 are carried out, the explanation of the steps will be omitted hereafter.

As mentioned above, in accordance with this Embodiment 6, because the rollover judging apparatus is constructed in such a way as to use the tilt angle detecting apparatus for vehicle in accordance with any of Embodiments 1 to 5, the rollover judging apparatus performs judgment of whether or not the vehicle is rolling over on the basis of the precise roll angle θv which is detected by the high-accuracy tilt angle detecting apparatus for vehicle 71, and can carry out control of expansion of the air bag so as to protect the passengers appropriately at the time when the vehicle is rolling over.

INDUSTRIAL APPLICABILITY

As mentioned above, because the tilt angle detecting apparatus for vehicle in accordance with the present invention and the rollover judging apparatus in accordance with the present invention which uses this tilt angle detecting apparatus are constructed in such a way as to detect the tilt angle of the vehicle in the roll direction of the vehicle correctly without having to provide any peripheral equipment and with a simple structure, and the tilt angle detecting apparatus for vehicle and the rollover judging apparatus are suitable for use in an airbag control unit or the like which, when the roll angle of the vehicle becomes equal to or larger than a predetermined angle, carries out control of expansion of the air bag so as to protect the passengers at the time when the vehicle is rolling over.

The invention claimed is:

1. A tilt angle detecting apparatus for vehicle comprising:
an angular velocity sensor for detecting an angular velocity of a vehicle which occurs in a roll direction of the vehicle;
an unnecessary component removing means in which a first angular velocity value is preset up for a setting of a deadband used for removing an unnecessary component, said unnecessary component removing means having both the deadband for reducing a level of an output signal to zero or attenuating this level when an angular velocity detecting signal inputted from said angular velocity sensor has an angular velocity level equal to or less than said first angular velocity value, and a passband for allowing the angular velocity detecting signal to pass therethrough and outputting this angular velocity detecting signal when the angular velocity detecting signal has an angular velocity level exceeding said first angular velocity value, for outputting the angular velocity detecting signal from which the unnecessary component is removed;
an arithmetic processing means for integrating the angular velocity detecting signal inputted from said unnecessary component removing means to output a signal having the integral value showing an angle; and
an integral value resetting means in which an integral value resetting value which is a fixed value is preset up, for resetting the integral value showing the angle of the signal inputted from said arithmetic processing means to zero by using said integral value resetting value in such a way that the integral value does not diverge, and for outputting a signal showing a tilt angle in the roll direction of the vehicle.

2. The tilt angle detecting apparatus for vehicle according to claim 1, characterized in that the unnecessary component removing means performs a subtraction process on the angular velocity detecting signal which passes through the passband with a preset angular velocity level value, and outputs the angular velocity detecting signal.

3. The tilt angle detecting apparatus for vehicle according to claim 1, characterized in that an attenuation band is set up in the passband of the unnecessary component removing means, and the unnecessary component removing means performs a subtraction process on the angular velocity detecting signal which passes through said attenuation band with a preset angular velocity level value.

4. A rollover judging apparatus which uses the tilt angle detecting apparatus for vehicle according to claim 1.

5. A tilt angle detecting apparatus for vehicle comprising:
an angular velocity sensor for detecting an angular velocity of a vehicle which occurs in a roll direction of the vehicle;
an unnecessary component removing means in which a first angular velocity value is preset up for a setting of a deadband used for removing an unnecessary component, said unnecessary component removing means having both the deadband for reducing a level of an output signal to zero or attenuating this level when an angular velocity detecting signal inputted from said angular velocity sensor has an angular velocity level equal to or less than said first angular velocity value, and a passband for allowing the angular velocity detecting signal to pass therethrough and outputting this angular velocity detecting signal when the angular velocity detecting signal has an angular velocity level exceeding said first angular velocity value, for outputting the angular velocity detecting signal from which the unnecessary component is removed;
an arithmetic processing means for integrating the angular velocity detecting signal inputted from said unnecessary component removing means to output a signal having the integral value showing an angle;
an integral value resetting means for resetting the integral value showing the angle of the signal inputted from said arithmetic processing means to zero by using an integral value resetting value in such a way that the integral value does not diverge, and for outputting a signal showing a tilt angle in the roll direction of the vehicle; and
an angular velocity level judging means for judging the angular velocity level of the angular velocity detecting signal inputted from said angular velocity sensor so as to make the integral value resetting value become larger with increase in the angular velocity level judged thereby and set the integral value resetting value to said integral value resetting means.

6. The tilt angle detecting apparatus for vehicle according to claim 5, characterized in that the unnecessary component removing means performs a subtraction process on the angular velocity detecting signal which passes through the passband with a preset angular velocity level value, and outputs the angular velocity detecting signal.

7. The tilt angle detecting apparatus for vehicle according to claim 5, characterized in that an attenuation band is set up in the passband of the unnecessary component removing means, and the unnecessary component removing means performs a subtraction process on the angular velocity detecting signal which passes through said attenuation band with a preset angular velocity level value.

8. The tilt angle detecting apparatus for vehicle according to claim 5, characterized in that a second angular velocity value showing an upper limit of the deadband and a third angular velocity value which belongs to a rollover region of the vehicle and has a larger value than said second angular velocity value are preset to the angular velocity level judging means, and the angular velocity level judging means sets a predetermined maximum of the integral value resetting value to the integral value resetting means when the judged angular velocity level of the angular velocity detecting signal is equal to or less than the second angular velocity value, and sets the integral value resetting value of the integral value resetting means to zero when said judged angular velocity level of the angular velocity detecting signal is equal to or greater than the third angular velocity value.

9. The tilt angle detecting apparatus for vehicle according to claim 8, characterized in that when the judged angular velocity level of the angular velocity detecting signal is between the second angular velocity value and the third angular velocity value, the angular velocity level judging means sets the integral value resetting value of the integral value resetting means to a value between the maximum and zero according to preset reduction characteristics.

10. A rollover judging apparatus which uses the tilt angle detecting apparatus for vehicle according to claim 5.

* * * * *